(12) United States Patent
Prowe

(10) Patent No.: US 7,740,217 B2
(45) Date of Patent: Jun. 22, 2010

(54) HOLDER FOR A BEVERAGE CONTAINER

(75) Inventor: Burkhard Prowe, Bad Urach (DE)

(73) Assignee: Fischer Automotive Systems GmbH, Horb (DE)

( * ) Notice: Subject to any disclaimer, the term of this patent is extended or adjusted under 35 U.S.C. 154(b) by 204 days.

(21) Appl. No.: 11/857,715

(22) Filed: Sep. 19, 2007

(65) Prior Publication Data

US 2008/0073227 A1 Mar. 27, 2008

(30) Foreign Application Priority Data

Sep. 26, 2006 (DE) .................. 10 2006 045 228

(51) Int. Cl.
*A47K 1/08* (2006.01)

(52) U.S. Cl. .................... 248/311.2; 224/281; 220/737; 296/24.34

(58) Field of Classification Search .............. 248/311.2, 248/311.3; 224/281, 282, 42.45; 297/188.14, 297/188.17, 24.34; 220/737; 296/24.34
See application file for complete search history.

(56) References Cited

U.S. PATENT DOCUMENTS

| | | | |
|---|---|---|---|
| 4,892,281 A | 1/1990 | Difilippo et al. | |
| 4,955,571 A * | 9/1990 | Lorence et al. | 248/311.2 |
| 5,024,411 A * | 6/1991 | Elwell | 248/311.2 |
| 5,379,978 A * | 1/1995 | Patel et al. | 248/311.2 |
| 5,427,447 A * | 6/1995 | Satoh | 312/309 |
| 6,409,061 B1 * | 6/2002 | Fischer et al. | 224/281 |
| 6,464,187 B1 * | 10/2002 | Bieck et al. | 248/311.2 |
| 6,575,542 B2 * | 6/2003 | Shimajiri | 312/332 |
| 6,779,769 B1 | 8/2004 | York et al. | |
| 6,971,618 B2 * | 12/2005 | Moyer | 248/311.2 |
| 7,131,690 B2 * | 11/2006 | Bollaender et al. | 297/188.17 |
| 2002/0008415 A1 | 1/2002 | Bollaender et al. | |
| 2005/0000991 A1 * | 1/2005 | Kogami | 224/483 |

FOREIGN PATENT DOCUMENTS

| | | |
|---|---|---|
| DE | 198 20 511 | 12/1998 |
| DE | 198 05 017 | 8/1999 |
| DE | 199 44 817 | 3/2001 |
| DE | 100 37 058 | 2/2002 |
| DE | 103 37 525 | 3/2004 |
| JP | 05193405 | 8/1993 |
| JP | 08132969 * | 5/1996 |
| JP | 09263169 | 10/1997 |

* cited by examiner

*Primary Examiner*—A. Joseph Wujciak, III
*Assistant Examiner*—Todd M. Epps
(74) *Attorney, Agent, or Firm*—Michael J. Striker

(57) ABSTRACT

A holder for two beverage containers is provided for installation in a motor vehicle. The holder has a pull-out element having insertion openings for the beverage containers. The pull-out element is guided not only displaceably but also is mounted pivotally, so that, as desired, one insertion opening instead of both insertion openings is accessible and available for use.

7 Claims, 1 Drawing Sheet

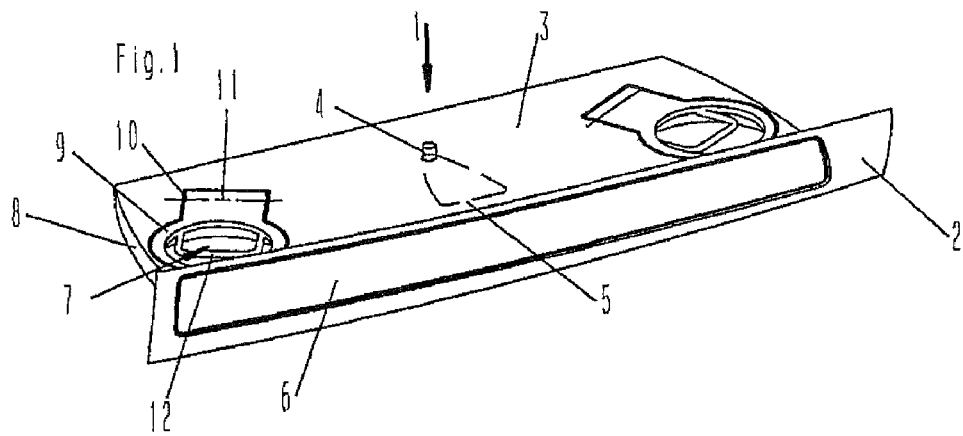
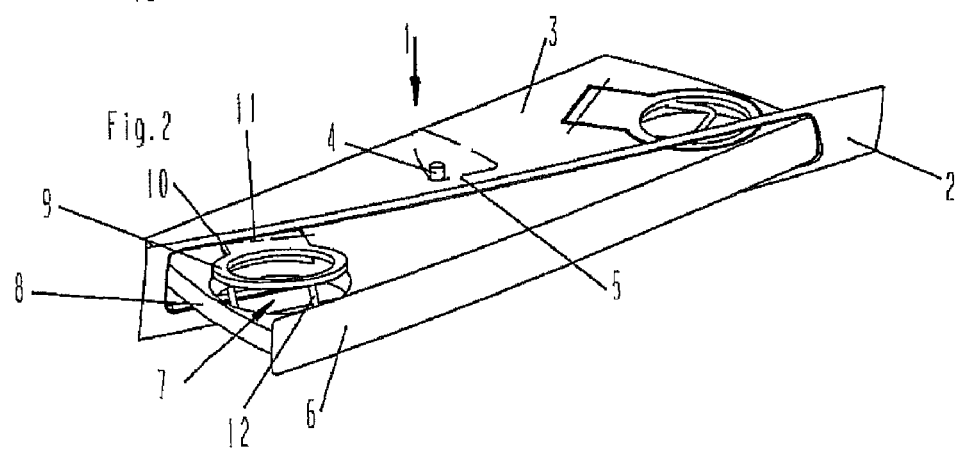
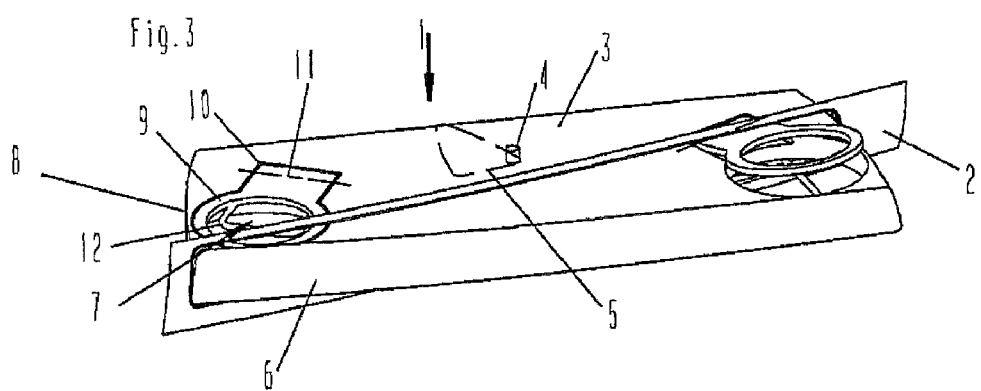
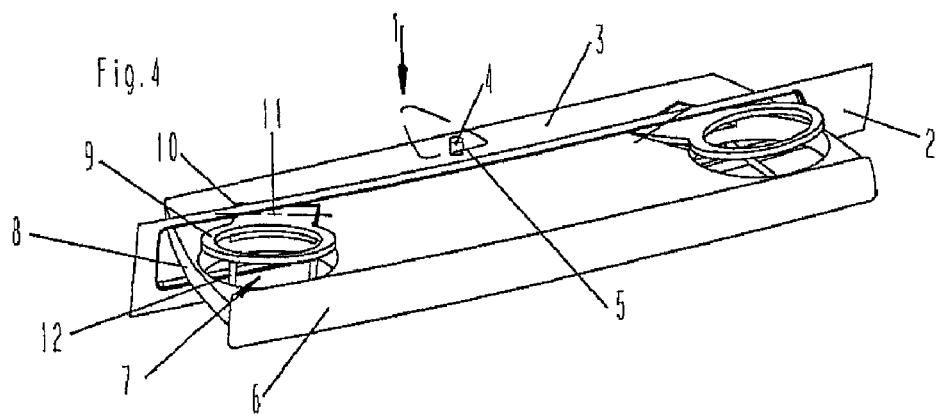

HOLDER FOR A BEVERAGE CONTAINER

CROSS-REFERENCE TO A RELATED APPLICATION

The invention described and claimed hereinbelow is also described in German Patent Application DE 10 2006 045 228.3 filed on Sep. 26, 2006. This German Patent Application, whose subject matter is incorporated here by reference, provides the basis for a claim of priority of invention under 35 U.S.C. 119(a)-(d).

BACKGROUND OF THE INVENTION

The invention relates to a holder for a beverage container.

Such holders, also called cup holders, are known per se. They are provided, for example, for installation in dashboards or central consoles of motor vehicles. The holders have a pull-out having one or two insertion openings for insertion of drinks containers. Beverage containers are to be understood as being beverage cans, cups, beakers, bottles and the like. The pull-out is displaceably guided like a drawer; it can be displaced from a pushed-in normal position into a pulled-out in-use position and vice versa. In the pushed-in normal position, the pull-out is recessed in, for example, the dashboard or the central console of a motor vehicle; the insertion openings are not accessible and the pull-out is not available for use. In the pulled-out in-use position, the pull-out projects into the interior of the motor vehicle and the insertion openings are accessible for insertion of beverage containers.

SUMMARY OF THE INVENTION

Accordingly, it is an object of the present invention to propose a holder of the kind described above in which the two insertion openings are accessible separately or are both accessible, as desired.

In keeping with these objects and with others which will become apparent hereinafter, one feature of the present invention resides, briefly stated, in a holder for a beverage container, comprising a pull-out element having two insertion openings for beverage containers and guided to be displaceable back and forth between a pushed-in normal position and a pulled-out in-use position, so that two insertion openings are accessible in said pulled-out in-use position for installation of beverage containers, said pull-out element being pivotal so that either one of said two insertion openings is acceptable as desired.

The pull-out of the holder according to the invention not only is displaceable but is also pivotable about a vertical axis. By pivoting, the pull-out can be moved so that one side of the pull-out projects into the interior of the motor vehicle and the insertion opening on that side is accessible. The other side of the pull-out does not project from, for example, the dashboard or the central console. By pivoting in the opposite direction, the other side of the pull-out projects into the passenger compartment. The insertion opening on the other side of the pull-out is accessible for insertion of a beverage container. Without any change being necessary, the pull-out of the holder according to the invention is displaceable so that both insertion openings are accessible.

In order that the width of the gap between an opening from which the pull-out of the holder can be pulled out is kept small, in one construction in accordance with the invention side faces of the pull-out are convexly rounded. In a preferred construction in accordance with the invention, the radius of curvature corresponds approximately to the width of the pull-out. When the pull-out is being pivoted, the width of the gap therefore remains the same. The pull-out is at its widest on its front face facing the interior of the vehicle, so that in the pushed-in normal position it closes the opening with narrow gaps on both sides.

In order better to hold inserted beverage containers against tipping over, one construction in accordance with the invention provides a side support which moves upwards when the pull-out is being pulled out and provides lateral support for a beverage container inserted into the insertion opening of the pull-out. The side support can have, for example, a ring, which is mounted on the pull-out by means of an arm so as to be pivotable upwards and which pivots upwards under the action of a spring. Preferably, a side support is provided for each insertion opening.

One construction in accordance with the invention provides a support foot which moves downwards when the pull-out is being pulled out and on which a beverage container inserted into the insertion opening is supported. By means of the support foot, the insertion depth of the insertion opening can be increased, so that a beverage container inserted into the insertion opening is better held against tipping over.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 1-4 of the drawings are views showing a holder for a beverage container in accordance with the present invention in four different positions.

DESCRIPTION OF THE PREFERRED EMBODIMENTS

The holder according to the invention shown in the drawing is provided for installation in, for example, a dashboard or a central console of a motor vehicle (not shown). In the drawing, the dashboard or the central console are shown as a fascia panel 2, in the opening of which a pull-out element 3 of the holder 1 is arranged. The pull-out element 3 takes the form of a plate which in the exemplary embodiment is wider than it is long, the length being the dimension in the displacement direction of the pull-out element 3, that is to say perpendicular to the fascia panel 2.

On its upper side, the pull-out element 3 has a pin 4 which engages in a triangular recess 5 (shown by dotted lines), the position of which is fixed. The triangular recess 5 is arranged perpendicularly to the fascia panel 2 and with its base parallel to the fascia panel 2. The pin 4 is arranged in the middle of the pull-out element 3, seen in the lateral direction. On its underside, the pull-out element 3 has a pin arranged on the same axis, which engages in a congruent recess. The pin and the recess on the underside are concealed by the pull-out element 3 and are therefore not visible in the drawing.

By means of the pin 4, the pull-out element 3 is displaceably guided and pivotally mounted in the recess 5. The pull-out element 3 can be displaced from the normal position shown in FIG. 1 into the pulled-out in-use position shown in FIG. 4. In the normal position, a front side 6 of the pull-out element 3 closes flush with the fascia panel 2; the pull-out element 3 is recessed. In the in-use position shown in FIG. 4, the pull-out element 3 projects from the fascia panel 2 into the passenger compartment of the motor vehicle (not shown).

Close to its front side, the pull-out element 3 has on each side an insertion opening 7 for insertion of a beverage container (not shown) such as, for example, a beverage can, a beaker, a cup, a bottle or the like. In the pushed-in normal position, the insertion openings 7 are located behind the fascia panel 2; they are not accessible. In the pulled-out in-use position, the insertion openings 7 are located in front of the fascia panel 2 and are accessible for insertion of beverage containers.

By means of the pivot bearing having the pins 4 in the recesses 5 on its upper side and underside, the pull-out element 3 is pivotable by means of the pins 4 in both directions about a notional vertical axis into the positions shown in FIGS. 2 and 3. In each of the pivoted positions, the pull-out element 3 projects from the fascia panel 2 on one side; one of the insertion openings 7 is located accessibly in front of the fascia panel 2. The other insertion opening 7 remains recessed behind the fascia panel 2 and in the pivoted positions of the pull-out element 3 shown in FIGS. 2 and 3 is not available for use.

Side faces 8 of the pull-out element 3 are rounded convexly in an arc of a circle, the radius of curvature corresponding to the width of the pull-out element 3. The widest point of the pull-out element 3 is its front side 6 which closes the opening in the fascia panel 2 with narrow gaps when the pull-out element 3 has been pushed into the normal position. By virtue of the curvature of the side faces 8, the gaps between the opening of the fascia panel 2 and the pull-out element 3 remain narrow during pivoting into the positions shown in FIGS. 2 and 3.

On its upper side, the pull-out element 3 has for each insertion opening 7 a ring-shaped side support 9 which surrounds the insertion opening 7. The side support 9 has a radially projecting arm 10, from the end of which pins (concealed in the drawing) project laterally outwards, which pins engage in bearing holes (likewise concealed) in the pull-out element 3. The side support 9 is thus pivotable upwards about a notional horizontal pivot axis 11. A spring element, which is likewise concealed and therefore not visible, pivots the side support 9 upwards when the pull-out element 3 is being pulled out, as can be seen in FIGS. 2 to 4.

An inserted beverage container is thus supported laterally at a relatively high level and held secure against tipping over in the insertion opening 7 of the pull-out element 3. When the pull-out element 3 is being pushed in, the upper edge of the opening of the fascia panel 2 presses the side supports 9 downwards into a position in which they are recessed in the upper side of the pull-out element 3, as shown in FIG. 1.

In a comparable way to the side supports 9, the pull-out element 3 has on its underside support feet 12 which cover the underside of the insertion openings 7 on the underside of the pull-out element 3 and are mounted in the pull-out element 3 so as to be pivotable downwards. The support feet 12 pivot downwards under gravity when the pull-out element 3 is being pulled out and, when the pull-out element 3 is being pushed into the normal position in which it is recessed in the fascia panel 2, are pivoted upwards to the underside of the pull-out element 3 by a lower edge of the opening in the fascia panel 2.

Beverage containers inserted into the insertion openings 7 are supported on the support feet 12 which are downwardly pivoted when the pull-out element 3 is in the pulled-out position. The support feet 12 increase the insertion depth of the insertion openings 7 and thus likewise improve the lateral support of inserted beverage containers and therewith their security against tipping over.

It will be understood that each of the elements described above, or two or more together, may also find a useful application in other types of constructions differing from the type described above.

While the invention has been illustrated and described as embodied in a holder for a beverage container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A holder for a beverage container, comprising:
a single pull-out element having two insertion openings for beverage containers and guided to be displaceable back and forth between a pushed-in normal position and a pulled-out in-use position, so that two insertion openings are accessible in said pulled-out in-use position for installation of beverage containers, and wherein said pull-out element is pivotal inside a dashboard or a central console of a vehicle in opposite directions about a rotational vertical axis so that either one of said two insertion openings is selectively accessible.

2. A holder as defined in claim 1, wherein said pulled-out element has side faces which are convexly rounded.

3. A holder as defined in claim 2, wherein said side faces have a radius of curvature which substantially corresponds to a width of said pulled-out element.

4. A holder for a beverage container, comprising:
a single pull-out element having two insertion openings for beverage containers and guided to be displaceable back and forth between a pushed-in normal position and a pulled-out in-use position, so that two insertion openings are accessible in said pulled-out in-use position for installation of beverage containers, and wherein said pull-out element is pivotal inside a dashboard or a central console of a vehicle in opposite directions about a rotational vertical axis so that either one of said two insertion openings is selectively accessible,
wherein said pulled-out element has side faces which are convexly rounded,
wherein said side faces have a radius of curvature which substantially corresponds to a width of said pulled-out element, and
wherein said pull-out element is at its widest on its front side.

5. A holder as defined in claim 1, wherein said pull-out element has a side support for said insertion opening, which moves upwards when said pull-out element is being pulled out and provides lateral support for a beverage container inserted into said insertion opening.

6. A holder as defined in claim 1, wherein said pull-out element has a support foot which moves downwards when said pull-out element is being pulled out and onto which a beverage container is placeable through said insertion opening.

7. A holder for a beverage container, comprising:

a single pull-out element having two insertion openings for beverage containers and guided to be displaceable back and forth between a pushed-in normal position and a pulled-out in-use position, so that two insertion openings are accessible in said pulled-out in-use position for installation of beverage containers, and wherein said pull-out element is pivotal inside a dashboard or a central console of a vehicle in opposite directions about a rotational vertical axis so that either one of said two insertion openings is selectively accessible, wherein said pulled-out element has side faces which are convexly rounded, and wherein said pull-out element is at its widest on its front side.

* * * * *